(12) United States Patent
Chaki et al.

(10) Patent No.: US 10,425,476 B2
(45) Date of Patent: Sep. 24, 2019

(54) GROUP FORMATION CONTROL IN MULTI-GROUP PEER-TO-PEER NETWORK

(71) Applicant: NEC CORPORATION, Tokyo (JP)

(72) Inventors: Prakash Chaki, Tokyo (JP); Masato Yasuda, Tokyo (JP); Kazuaki Nakajima, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/745,302

(22) PCT Filed: Sep. 3, 2015

(86) PCT No.: PCT/JP2015/004482
§ 371 (c)(1),
(2) Date: Jan. 16, 2018

(87) PCT Pub. No.: WO2017/037764
PCT Pub. Date: Mar. 9, 2017

(65) Prior Publication Data
US 2019/0014172 A1    Jan. 10, 2019

(51) Int. Cl.
*H04L 29/08* (2006.01)
*H04W 8/18* (2009.01)
*H04W 84/20* (2009.01)

(52) U.S. Cl.
CPC ...... *H04L 67/1059* (2013.01); *H04L 67/1046* (2013.01); *H04L 67/1051* (2013.01);
(Continued)

(58) Field of Classification Search
None
See application file for complete search history.

(56) References Cited

U.S. PATENT DOCUMENTS 6,396,814 B1 *  5/2002  Iwamura ............... H04L 12/185
                                              370/230
2007/0066319 A1   3/2007  Kado
(Continued)

FOREIGN PATENT DOCUMENTS

JP      11-88363 A      3/1999
JP      2007-74568 A    3/2007
(Continued)

OTHER PUBLICATIONS

"Wi-Fi Peer-to-Peer (P2P) Technical Specification Version 1.4," WiFi Affiance, 2014, 183 pgs.
(Continued)

*Primary Examiner* — Chirag G Shah
*Assistant Examiner* — Srinivasa R Reddivalam
(74) *Attorney, Agent, or Firm* — Sughrue Mion, PLLC

(57) ABSTRACT

A mechanism by which the number of groups can be reduced in a multi-group P2P network is disclosed. A method for group formation in wireless peer-to-peer (P2P) networks, includes: exchanging group-related information between group owners of neighboring P2P groups; deciding on whether a combined group of the neighboring P2P groups meets a predetermined condition of either of the neighboring P2P groups, based on the group-related information of the neighboring P2P groups; and merging the neighboring P2P groups to form at least one single group when the combined group meets the predetermined condition.

18 Claims, 9 Drawing Sheets

(52) U.S. Cl.
CPC .......... *H04L 67/1068* (2013.01); *H04L 67/16* (2013.01); *H04W 8/186* (2013.01); *H04W 84/20* (2013.01)

(56) References Cited

U.S. PATENT DOCUMENTS

| | | | |
|---|---|---|---|
| 2015/0245275 A1 | 8/2015 | Naka et al. | |
| 2015/0264123 A1* | 9/2015 | Smadi ..................... | H04W 4/12 709/206 |
| 2016/0094958 A1* | 3/2016 | Thakur ................. | H04W 76/14 370/338 |
| 2016/0249200 A1* | 8/2016 | Liu ....................... | H04W 8/005 |

FOREIGN PATENT DOCUMENTS

| | | | | |
|---|---|---|---|---|
| JP | 2009-55083 A | | 3/2009 | |
| JP | 2009055083 A | * | 3/2009 | ............ H04W 84/12 |
| JP | 2010-171917 A | | 8/2010 | |
| JP | 2014-511136 A | | 5/2014 | |
| JP | 2015-510699 A | | 4/2015 | |
| WO | 2013/105288 A1 | | 7/2013 | |

OTHER PUBLICATIONS

International Search Report for PCT/JP2015/004482, dated Nov. 17, 2015 (PCT/ISA/237).
Written Opinion of the International Searching Authority for PCT/JP2015/004482, dated Nov. 17, 2015 (PCT/ISA/237).
Communication dated Feb. 5, 2019 issued by the Japanese Patent Office in counterpart application No. 2017-564520.

* cited by examiner

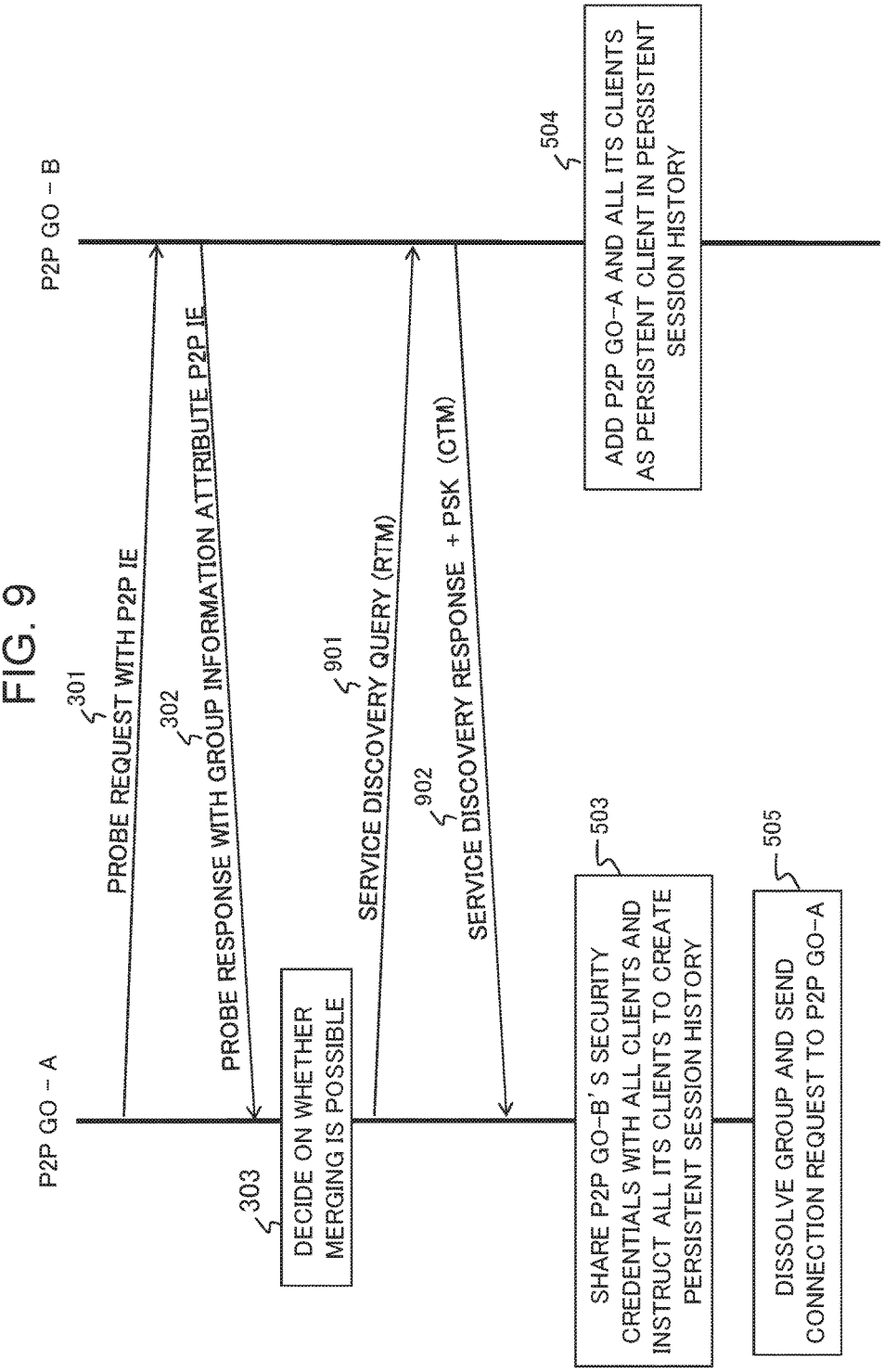

GROUP FORMATION CONTROL IN MULTI-GROUP PEER-TO-PEER NETWORK

CROSS REFERENCE TO RELATED APPLICATIONS

This application is a National Stage of International Application No. PCT/JP2015/004482filed Sep. 3, 2015, the contents of all of which are incorporated herein by reference in their entirety.

TECHNICAL FIELD

The present invention generally relates to control techniques of wireless communication networks, and more particularly to a mechanism for controlling group formation in wireless peer-to-peer (P2P) networks.

BACKGROUND ART

In contrast to the traditional infrastructure mode of Wi-Fi, the recently released standard Wi-Fi Peer to peer (P2P), which is also known as Wi-Fi Direct, sheds off the need for a specialized hardware to act as Access Point. Wi-Fi P2P Technical Specification Version 1.4 (NPL1) states the provision that allows any Wi-Fi P2P device to take up the role of P2P Group Owner (analogous to Access Point of Wi-Fi infrastructure mode). Before starting data communication among themselves, a pair of Wi-Fi P2P device discovers each other and negotiates to decide the device that will act as P2P Group Owner (P2P GO). After that the security keys are exchanged and a Wi-Fi P2P group is established. The P2P GO can then add more devices to its group as P2P Client (analogous to STA in traditional Wi-Fi infrastructure mode). The P2P Clients connect to the P2P GO according to a star topology wherein the P2P GO routes packets from one P2P Client to another.

In this disclosure, a group which has lesser number of Clients than its maximum supportable size (or some other threshold size) is referred to as an unsaturated group. Alternatively, a group with group size equal to the maximum supportable size (or, greater or equal to some threshold size) is referred to as a saturated group.

CITATION LIST

Non Patent Literature

[NPL 1]
Wi-Fi Peer-To-Peer (P2P) Technical Specification Version 1.4

SUMMARY

Technical Problem

Wi-Fi P2P GO can add a limited number of devices as P2P Client to its group. In a large gathering of several Wi-Fi P2P capable devices, it is highly possible that many groups would be created whose size will be less than maximum group-size. In such cases in multi-group Wi-Fi P2P network, it is a technical problem as number of groups is not optimized. Such an un-optimized Wi-Fi P2P network with many unsaturated groups has to maintain a higher number of P2P GOs. A high number of P2P GOs in a network amounts to higher power consumption as a P2P GO device has to route packets from its P2P Clients along with managing group by sending beacons. Also, a higher number of groups require greater resources for inter-group communication which also brings inefficiency (e.g., high latency, high power consumption etc.) to the multi-group Wi-Fi P2P network.

An object of the present invention is to solve foregoing problems and to provide a mechanism by which the number of groups can be reduced in a multi-group P2P network.

Solution to Problem

According to the present invention, a method for group formation in wireless peer-to-peer (P2P) networks, includes: exchanging group-related information between group owners of neighboring P2P groups; deciding on whether a combined group of the neighboring P2P groups meets a predetermined condition of either of the neighboring P2P groups, based on the group-related information of the neighboring P2P groups; and merging the neighboring P2P groups to form at least one single group when the combined group meets the predetermined condition.

According to the present invention, a wireless device operable as a group owner of a peer-to-peer (P2P) group in wireless P2P networks, includes: a first controller configured to send its own group-related information to a neighboring group owner of a neighboring P2P group and to receive neighboring group-related information from the neighboring group owner; and a second controller configured to: decide on whether a combined group of its own P2P group and the neighboring P2P group meets a predetermined condition of either of its own P2P group and the neighboring P2P group, based on its own group-related information and the neighboring group-related information; and merge the neighboring P2P group and its own P2P group to form a single group when the combined group meets the predetermined condition.

According to the present invention, a system for group formation in wireless peer-to-peer (P2P) networks, wherein group owners of neighboring P2P groups exchange group-related information; one of the neighboring P2P groups decides on whether a combined group of the neighboring P2P groups meets a predetermined condition of the one of the neighboring P2P groups, based on the group-related information of the neighboring P2P groups; and the one of the neighboring P2P groups merges the other of the neighboring P2P groups to form at least one single group when the combined group meets the predetermined condition.

Advantageous Effects of Invention

According to the present invention, number of unsaturated wireless P2P groups in a multi-group wireless P2P network can be reduced, thus optimizing the network to minimum or near-minimum number of groups which may improve network performance in terms of end-to-end delay and throughput, also saving overall power consumption.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

BRIEF DESCRIPTION OF DRAWINGS

FIG. 9 is a schematic diagram showing a fifth example of message exchange before group merging according to the exemplary embodiment of the present invention.

DETAILED DESCRIPTION

Figure 1:
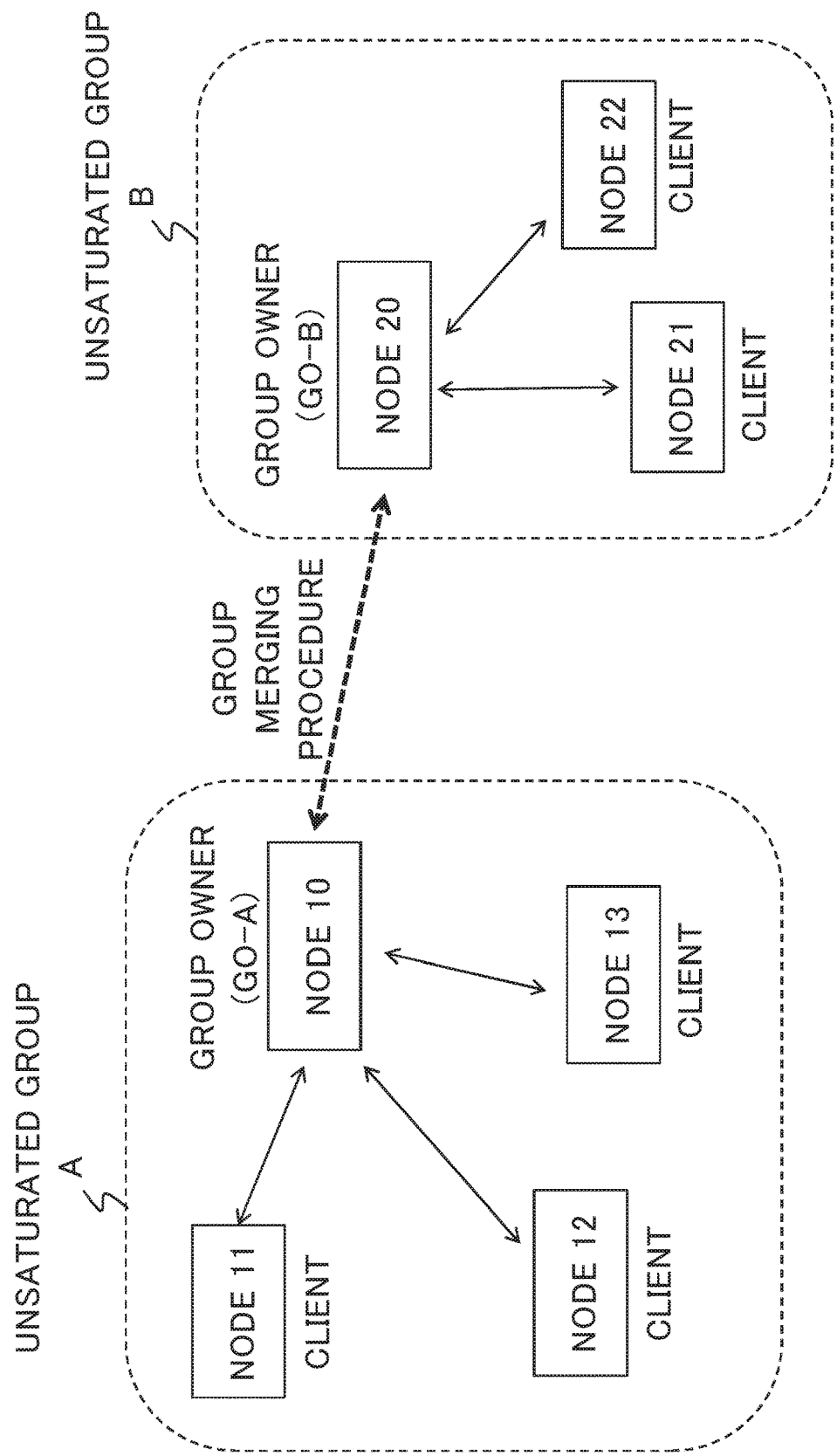
FIG. 1 is a schematic diagram showing a multi-group peer-to-peer (P2P) network according to an exemplary embodiments of the present invention.

Hereinafter, the word "exemplary" is used herein to mean "serving as an example, instance or illustration". Any embodiment described herein as "exemplary" is not necessarily to be construed as preferred or advantageous over other embodiments. Further, exemplary embodiments of the present invention will be described according to WiFi Direct Standard as an example.

1. Outline of Exemplary Embodiments

The conventional technical problems as discussed above can be solved by one or many variants of the exemplary embodiments of the present invention.

According to the exemplary embodiments of the present invention, reduction in the number of groups in a multi-group Peer-To-Peer (P2P) network can be achieved by merging groups who have fewer clients than its maximum permissible group size. A P2P Group Owner (GO) whose group size (i.e., the total number of nodes in a group) is less than the maximum permissible group size (or some threshold size) for that P2P GO, may iteratively send Probe Request frames with its group information including the number of P2P Clients (or the number of available or vacant P2P Client positions). After discovering neighboring P2P GOs, it may compute if the combined group size of any neighboring P2P GO and its own group is less than or equal to the maximum permissible group size (or some threshold size) for any of those two P2P GOs; if at least one such P2P group is found, then they may exchange some merging-related control messages and one group may merge with the other.

A method of announcing group size information by a P2P GO of a Wi-Fi P2P group in the Device Discovery may be employed to enable other P2P groups in the neighborhood to know whether there is an opportunity for group merging. Such method may be implemented by including P2P Information Element (P2P IE) in the Probe Request frame from a P2P GO, which may trigger the receiving P2P GOs to include their P2P Group Information attribute in the Probe Response. Alternatively, such group information may be obtained from the group information advertisement in the Beacon frame transmitted by a P2P GO. However, there can be other variants of the method to share group information (e.g. number of clients) among P2P GOs including, but not limited to, appending such information in the Probe Request and/or Probe Response frames and/or beacon frame, or by enabling a client from one group switch connection to another group carrying group-related or merging-related information between the first group and the second group, or by using concurrent operation where a single device may act as member of two P2P groups and share merging-related information between first group and second group. Such information may also be shared by using Service Discovery Query and Service Discovery Response frames.

Upon sharing information related to group sizes with each other, P2P GOs of a pair of unsaturated Wi-Fi P2P groups may share some control message either in unicast fashion or broadcast fashion before merging. This is to make a decision on which pair of unsaturated groups would merge first in a Wi-Fi P2P network with several unsaturated groups. Also, as an example of deciding on which group between a pair of groups will dissolve itself and merge with the other, a group with lower BSSID (Basic Service Set Identifier) may merge with the group with higher BSSID or vice-versa. The decision can also be made by using a tie-breaker bit in the handshake prior to merging, or whoever initiates the handshake may merge with the other or vice-versa. The exemplary embodiment does not limit only to pairwise merging of groups; the provision of multiple groups merging simultaneously is also included.

The problem of implementing the handshake procedure prior to group merging is also solved by the exemplary embodiments. Wi-Fi P2P Technical Specification does not provide any frame transmission outside group domain excepting Probe Request, Probe Response and beacon frames. In the exemplary embodiments, two frames, Request-To-Merge (RTM) and Confirm-To-Merge (CTM), are introduced, which may be constructed using the Probe Request or Probe Response or both by including merging related information in these frames. For example, such information may be included in the vendor specific attribute field of these frames.

There can be several variants of this handshake procedure prior to merging. In one variant, a P2P GO of an unsaturated group may send Probe Request broadcast frame with P2P Information Element (IE), thus triggering all receiving P2P GOs to respond with Probe Response unicast including their P2P Group Information Attribute. Thus the sending P2P GO comes to know about the number of clients in the neighboring groups. Based on this information, a P2P GO may decide which group it wants to merge with by checking if their combined group size is less than or equal to the maximum supportable group size (or some threshold size). After deciding the target group to merge with, a P2P GO may send a RTM (which can be either a Probe Request broadcast or unicast) containing merging related information including but not limited to BSSID of the target group. The P2P GO sending RTM may wait for a CTM frame (which can be either a Probe Request broadcast or unicast or Probe Response) as a reply from the P2P GO of target group.

Alternatively, in contrast to the above-mentioned case, there can also be a case where inter-group communication is already operating by some means, for example, concurrent operation or inter-group switching. In concurrent operation, a P2P Device may use multiple physical or virtual MAC entity to be part of two groups simultaneously and thus routing packets from one group to the other. In inter-group switching, a P2P GO or P2P Client may repetitively switch between two or more groups to transfer packets from one group to another. In such cases, the merging request and merging response may also be exchanged over such concurrent node or inter-group switching node.

According to the exemplary embodiments, quick merging of two groups by reducing the disruption time can be achieved. For instance, by sharing security key related credentials between two group owners during or after the RTM-CTM handshake, persistent session history can be created, allowing two groups to merge by P2P invitation procedure. By doing so, it reuses the keys of a past session and skips the phase for generation of authentication key by the Internal Registrar and sharing with the Enrollee, thus reducing the connection disruption caused due to merging.

2. Exemplary Embodiment

To solve the conventional technical problems as described above, an exemplary embodiment of the present invention provides a mechanism for merging of two or more unsaturated Wi-Fi P2P groups, which will be described with references to FIGS. 1 and 2.

As shown in FIG. 1, it is assumed that several unsaturated Wi-Fi P2P groups operate in neighborhood (inside each other's radio transmission range) who may want to communicate with each other. In FIG. 1, for simplicity, two unsaturated groups A and B are illustrated, the group A including its group owner node 10 (referred to as GO-A) and client nodes 11-13, and the group B including its group owner node 20 (referred to as GO-B) and client nodes 21 and 22. The nodes 10-13 and 20-22 are wireless devices each configured as a group owner or a client to handshake another wireless device to form a P2P group.

Figure 2:
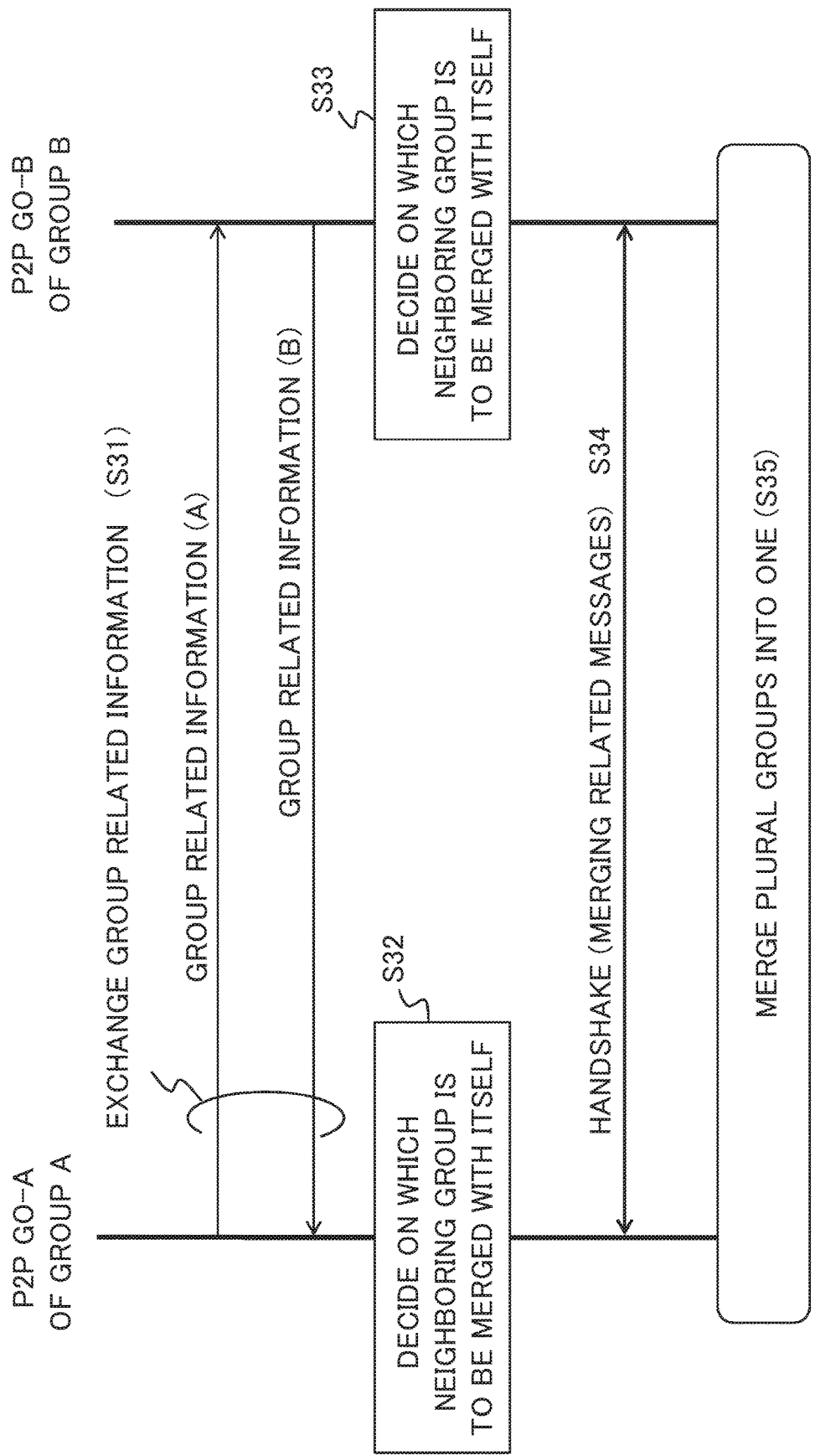
FIG. 2 is a sequence diagram showing the merging operations of group owner nodes in the multi-group peer-to-peer (P2P) network of FIG. 1.

Referring to FIG. 2, the GO-A and GO-B exchange their group related information with each other to share current group size (e.g. the number of clients) for each other group (Operation S31). The group related information includes at least group size information such as the number of nodes in a corresponding group. Each of the GO-A and GO-B calculates the total number of nodes included in the groups A and B and compares the total number of nodes to the maximum group size to decide on whether it is possible to merge the neighboring group with itself (Operations S32 and S33). If the total number of nodes is not greater than the maximum group size for the group A or the group B, the GO-A and GO-B start handshake procedure including exchange of merging-related messages (Operation S34) to merge the groups A and B into a single group (Operation S35).

Next, more detailed operations will be described. Taking a multi-group Wi-Fi P2P network scenario as an example, the P2P GO of each group may send Probe Request broadcast with P2P Information Element (P2P IE). This will trigger other P2P GO operating in the radio range of the sender to reply with a Probe Response with P2P Group Information Attribute in the P2P IE. The P2P GO receiving that Probe Request would then get the information about the number of clients (i.e. group size) in other Wi-Fi P2P groups operating in its neighborhood. The group information can also be known from the Beacon frames transmitted by a P2P GO. If every P2P GO has different permissible group size, then an alternative method of sharing information related to group size or group vacancy with other neighboring P2P GOs may be implemented by including such information in the Probe Request or Probe Response or Beacon frames. Such kind of information may be included in the WSC (Wi-Fi Simple Config) IE or Vendor Specific Attribute fields of Probe Request and/or Probe Response and/or Beacon frames. After receiving the group size or group vacancy information of neighboring groups, a Wi-Fi P2P GO may determine one or more suitable neighboring groups such that the sum of its own group size with one or more discovered neighboring groups is less than or equal to the maximum permissible group size (or some threshold size) of any one of the P2P GOs of such discovered group(s) or itself. Such groups may then exchange some merging related control messages among each other. After such control message exchange, the one or more of the groups may dissolve themselves and merge with a Wi-Fi P2P group.

3. First Modified Method

In a first variant of the above-described method according to the exemplary embodiment, a merging related control message may consist of messages including. but not limited to, a merging request (referred to as Request To Merge or RTM in this disclosure) and a merging response (referred to as Confirm To Merge or CTM in this disclosure). A RTM may be sent from one P2P GO to another P2P GO upon finding that their combined group size is less than the maximum permissible group size (or some threshold size) of any one of the P2P GO between them. If the P2P GO receiving a RTM agrees to merge, it may respond by sending a CTM. If a P2P GO sending a RTM does not receive a CTM till a timeout, it may repeat the transmission procedure of Probe Request or Beacon to find a P2P GO with whom it can merge and may send RTM. The RTM and CTM frames may consist of information including but not limited to the BSSID of sending and/or destined P2P GO. It also may include security credentials for joining a Wi-Fi P2P group by invitation.

In a modification of the first variant of the above-described method, the RTM frame can be a modified Probe Request frame. Since the Wi-Fi P2P Technical Specification does not provide any other broadcast frame excepting Probe Request or Probe Response or Beacon for communication outside group domain, the Probe Request frame may be modified to RTM by including merging related parameters (including but not limited to the BSSID of the destined group). In some implementations, a broadcast Probe Request can be modified to construct a RTM. In some other implementations, a unicast Probe Request can be used as RTM.

In another modification of the first variant of the above-described method, the CTM frame can be a modified Probe Request frame. Since the Wi-Fi P2P Technical Specification does not provide any other broadcast frame excepting Probe Request or Probe Response or Beacon for communication outside group domain, the Probe Request frame may be modified to CTM by including merging related parameters (including but not limited to the BSSID of the sender of RTM). In some implementations, a broadcast Probe Request may be modified to construct a CTM. In some other implementations, a unicast Probe Request can be used as CTM. In some implementations, the Probe Response frames generated in response to the RTM or CTM frames (constructed as the first example or the second example) may be suppressed or disabled to reduce unnecessary packet exchange.

In some modification of the first variant of the above-described method, the RTM and CTM message can be simply a modified Probe Request and Probe Response pair by including merging related information. In some variant, a Wi-Fi P2P GO may simply dissolve its group and all group members join a neighboring group who advertises vacant positions in its group.

In some modification of the first variant of the above-described method, the RTM and CTM messages can be exchanged using Generic Advertisement Service (GAS) protocol. The Service Discovery Query frame specified in Wi-Fi P2P technical specification uses the GAS Initial Request action frame; Service Discovery Response frame specified in Wi-Fi P2P technical specification uses the GAS Initial Response Action frame. Merging-related information can be put in the Vendor-Specific Content field. Both P2P GO and P2P Client are allowed to transmit and receive the Service Discovery Query and Service Discovery Response frames.

4. Second Modified Method

In a second variant of the above-described method, the RTM may be sent by a Wi-Fi P2P GO as broadcast message to enable all neighboring P2P GO operating in its radio range know that the sender P2P GO wants to merge with a destined P2P GO whose BSSID is specified in the RTM. Correspondingly, a P2P GO receiving a RTM may respond with a CTM broadcast message to enable all neighboring P2P GO operating in its radio range to know that the sender P2P GO confirms to merge with a destined P2P GO whose BSSID is specified in the RTM. This mechanism may prevent neighboring P2P GOs operating in their radio range from sending a RTM to any one of a merging pair of P2P GOs, thus avoiding disruption.

5. Third Modified Method

In a third variant of the above-described method, the RTM may be sent by a Wi-Fi P2P GO as unicast message destined to a neighboring P2P GO with whom it wishes to merge. A Wi-Fi P2P GO receiving a RTM may also respond with a unicast CTM to the sender of RTM. Such mechanism may be used to reduce traffic overhead that occurs in broadcast of control messages like RTM and CTM.

6. Fourth Modified Method

According to the method according to the exemplary embodiment, the merging procedure may be performed in a pairwise manner. For pairwise merging, only a pair of unsaturated Wi-Fi P2P groups may merge with each other at a given time, if the sum of their individual group sizes is less or equal to the maximum permissible group size (or some threshold size) of any one of the participating P2P GO. In non-pairwise merging, multiple unsaturated Wi-Fi P2P GOs may merge with a single unsaturated Wi-Fi P2P group subject to the condition that sum of their combined size is still less or equal to the maximum permissible size (or some threshold size) of the P2P GO with whom they intend to merge.

7. Other Modified Methods

According to the above-described methods according to the exemplary embodiment and the first to fourth modified methods, there can be a mechanism to decide which group between a pair of unsaturated Wi-Fi P2P groups who are willing to merge with each other dissolves itself and merges with the other. As described before, this can be achieved by using a method where a group with lower BSSID merges with the group with higher BSSID or vice-versa. The decision can also be made by using a tie-breaker bit in the handshake prior to merging, or whoever initiates the handshake may merge with the other or vice-versa.

In one variant of the above-described method, there can also be a case where inter-group communication is already operating by some means, for example, concurrent operation or inter-group switching. As described before, in concurrent operation, a P2P Device may use multiple physical or virtual MAC entity to be member (as P2P GO or P2P Client) of two groups simultaneously and thus routing packets from one group to the other. In inter-group switching, a P2P GO or P2P Client may switch between two or more groups to transfer packets from one group to another. In such cases, the merging request and merging response may also be exchanged over such concurrent node or inter-group switching node.

As another method, merging of a pair of Wi-Fi P2P groups is made possible by invitation mechanism. This method requires sharing of security related credentials necessary for creating persistent session history. Such credentials may be shared before, during or after merging request and response handshake. After receiving the credentials, the Wi-Fi P2P GO and Clients of one group may create a persistent session history with the Wi-Fi P2P GO of the other group who also creates persistent session history. After that, the groups may merge by invitation. This mechanism reduces the disruption time in merging event, thus prevents significant interruption in connectivity and network service during merging.

8. Advantageous Effects

As described above, according to the exemplary embodiment and several modified methods, it is possible to merge two or more groups whose combined size is less than the maximum permissible group size or less than some threshold size. Minimizing the number of groups translate to minimization of the number of P2P GOs. Since a P2P GO is responsible for routing packets within the group and managing the group by sending periodic beacons, its power consumption is understandably higher than P2P Clients. Optimizing a multi-group Wi-Fi P2P network by minimizing the total number of required P2P GOs thus reduces the total overall power consumption of the network. In addition, large number of groups also calls for investment of higher resources for intergroup communication. Such resources may include concurrent operation or inter-group switching. Both the mechanisms require a device to connect to two different groups in time-sharing basis which reduces the performance efficiency, but are indispensable for inter-group communication. Thus, minimizing the number of groups leads to lesser resource requirement for inter-group communication and improves overall network performance in terms of metrics including but not limited to end to end throughput and delay.

According to the exemplary embodiment and various modified methods as mentioned before, multiple unsaturated Wi-Fi P2P groups operating in neighborhood can be merged. Specifically, a problem of group disruption may happen in a case when multiple unsaturated groups try to merge with a single unsaturated group, if their combined group size is higher than the maximum permissible group size (or some threshold size). Such problem is avoided by exchanging merging request and response including the necessary information required for merging in a broadcast or unicast fashion.

If this handshake between a pair of Wi-Fi P2P groups is carried out in a broadcast fashion, it informs about the impending merging event to all Wi-Fi P2P GOs in neighborhood who are aspiring to merge with any one of the merging groups. This avoids disruption of multiple groups in trying to merge with a single group.

Alternatively, such a request can also be carried out in unicast fashion. In unicast method, a P2P GO aspiring to merge with another P2P GO sends a merge request to it in unicast fashion and waits for a merge response. If the target group responds back with a merge response, only then the merging event may be executed. A Wi-Fi P2P GO may respond to only one merge request at a time out of all the merge requests it receives at a time for pairwise merging. For non-pairwise merging, a Wi-Fi P2P GO may accept the merging request of multiple unsaturated P2P groups at the same time and respond to each of the P2P GO with which it wants to merge, given their combined group size is still less or equal to the maximum permissible group size (or some other threshold size) of any one of the participating P2P GO. Thus, all other P2P GOs who were aspiring to merge and had sent merge request but did not receive a merge response would refrain from merging. For implementing the broadcast or unicast frames, there is also introduced a mechanism to reuse the Probe Request or Probe Response frames by appending necessary merging related information in these frames.

As described above, according to the exemplary embodiment and the modified methods, the group disruption time involved in merging of two or more unsaturated Wi-Fi P2P groups can be also reduced. Specifically, before merging, a Wi-Fi P2P GO needs to dissolve its group and then all members of the dissolved group join another Wi-Fi P2P group one after another. Because of the comprehensive group joining procedure used in Wi-Fi P2P, it takes some time till all the members of the dissolved group join the other group. This temporary disruption time can be reduced by using invitation mechanism and thus prevents significant interruption in connectivity and network service during merging.

9. Examples

Hereinafter, several examples of the exemplary embodiment of the present invention will be described according to W-Fi Direct Standard as an example. The examples are discussed in its complete details with accompanying figures and finally explained with a typical example scenario.

9.1) System Configuration

Figure 3:
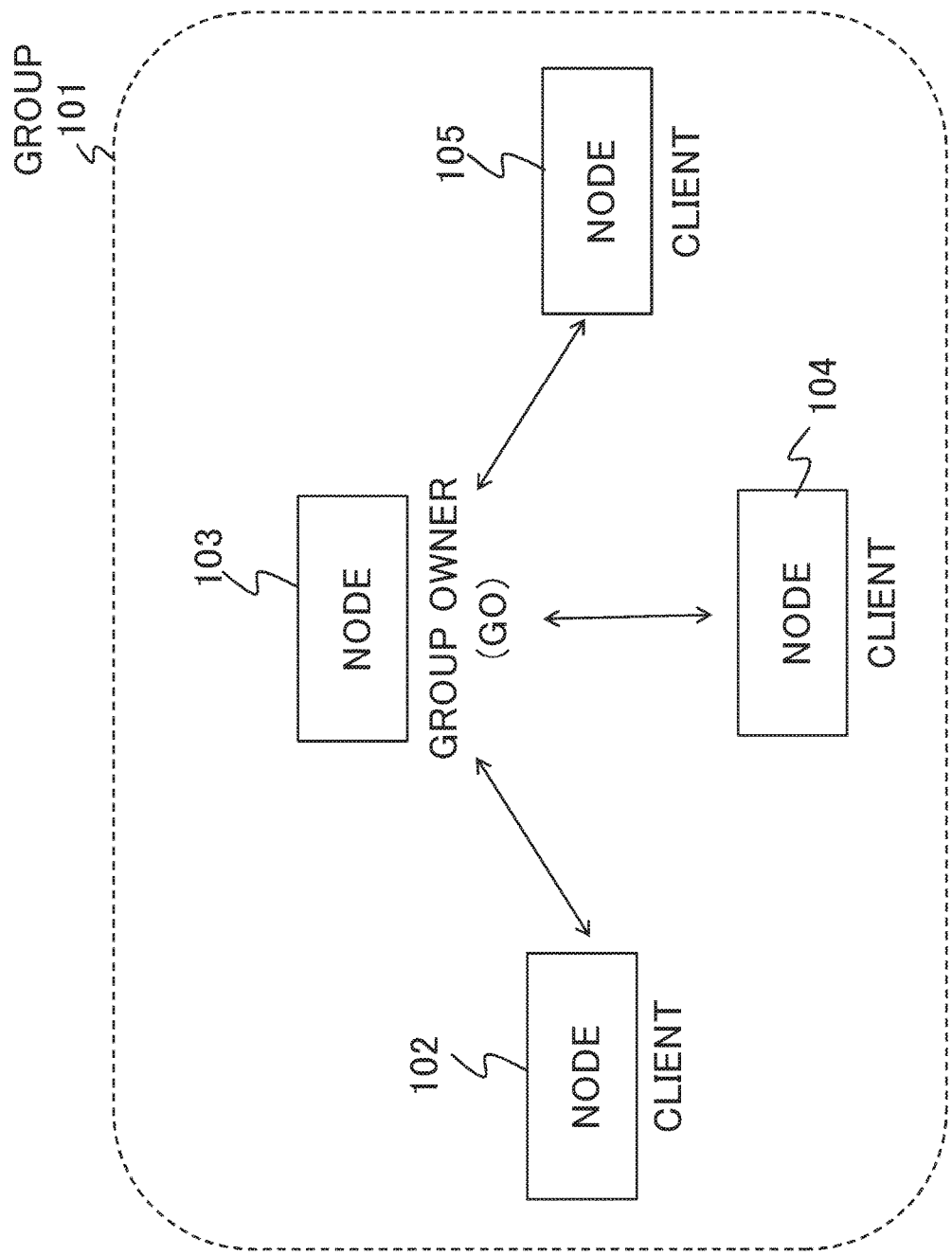
FIG. 3 is a schematic diagram showing a wireless peer-to-peer (P2P) group according to an example of the exemplary embodiment of the present invention.

FIG. 3 illustrates an exemplary Wi-Fi Direct group 101 which is similar to each of the unsaturated groups A and B as shown in FIG. 1. In the group 101, the node 103 operates as a Group Owner (GO) and other nodes 102, 104, 105 operate as associated Clients, respectively. Once the group 101 is formed, the GO node 103 plays a role analogous to that of an access point in a Wi-Fi infrastructure mode operation.

Figure 4:
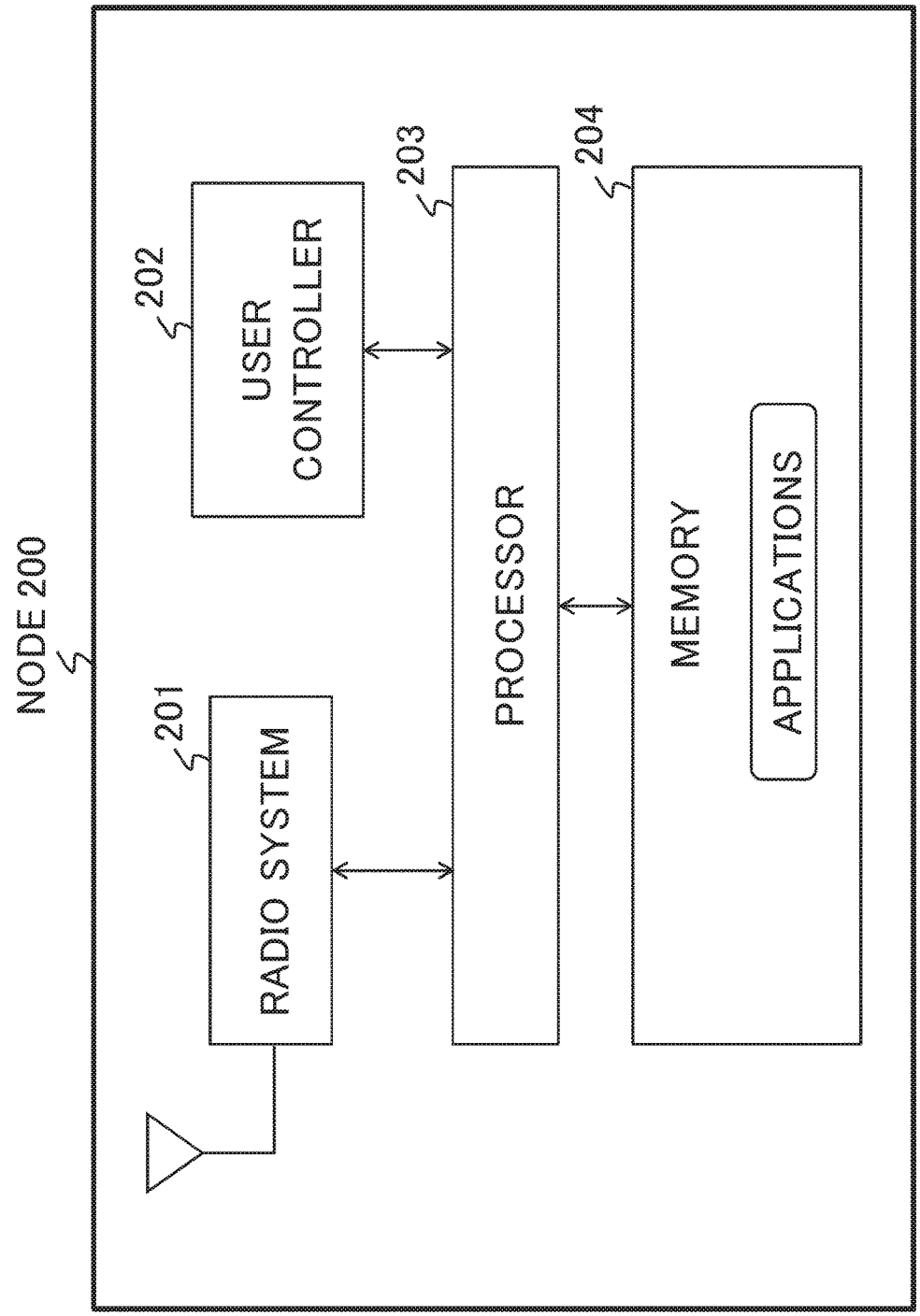
FIG. 4 is a block diagram showing the functional configuration of a node according to the example of the exemplary embodiment of the present invention.

FIG. 4 shows a schematic block diagram of a device used as a node 200 to perform communications in a Peer to Peer group according to one or more embodiments of the present invention. In various implementations, the device capable of functioning as a node 200 may be a personal computing device (e.g., smart phones, computing tablets, personal computers, laptops, Personal Digital Assistants (PDAs), etc.) capable of communicating with another device using Peer to Peer communication. The nodes 102~105 shown in FIG. 3 have the same configuration but may operate as GO or Client.

As shown in FIG. 4, the node 200 includes the following functionalities: a radio system 201, a user controller 202, a processor 203 and a memory 204. The radio system 201 includes a Wi-Fi Direct communication function. The user controller 202 controls Wi-Fi Direct connection procedures such as Device Discovery, GO Negotiation, Provisional Service Discovery and Invitation Mechanism etc. The processor 203 can execute the operating system and applications stored in the memory 204 or a separate storage device such as a semiconductor memory according to the present embodiment. The memory 204 may include a system memory component (e.g. RAM), a static storage component (e.g., ROM), and/or a disk drive. The node 200 performs specific operations by the processor 203 and other components by executing one or more sequences of instructions contained in the system memory component. Logic may be encoded in a computer readable medium, which may refer to any medium that participates in providing instructions to processor 203 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component, and transmission media includes coaxial cables, copper wire, and fiber optics, including wires that comprise buses. In one example, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, Compact Disc (CD) Read-Only Memory (ROM), any other optical medium, punch cards, paper tape, any other physical medium with patterns of holes, Random-Access Memory (RAM), Programmable ROM (PROM), Electrically Erasable Programmable ROM (EEPROM), FLASH-EEPROM, any other memory chip or cartridge, or any other medium from which a computer is adapted to read.

9.2) First Example of Operation

Figure 5:
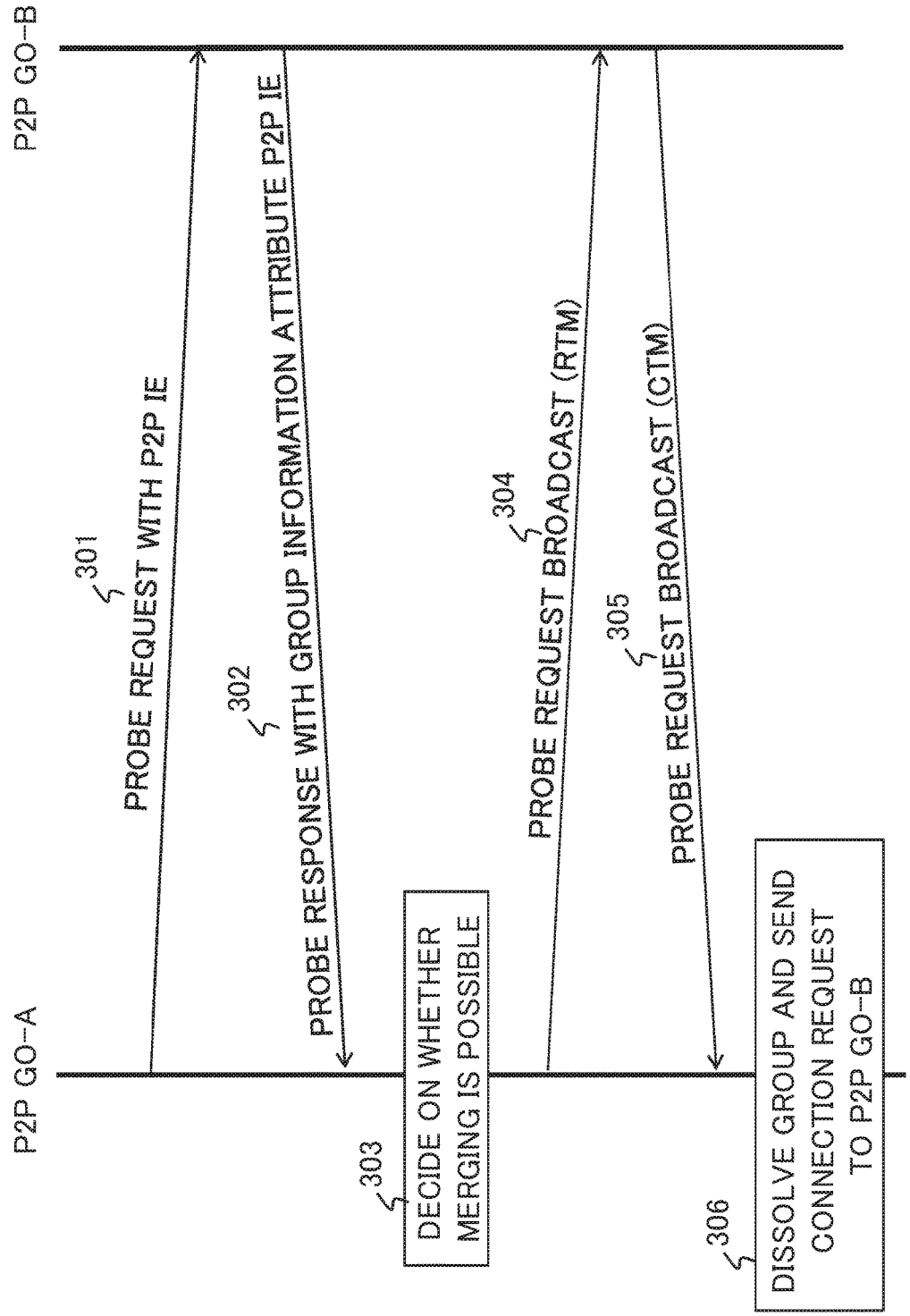
FIG. 5 is a schematic diagram showing a first example of message exchange before group merging according to the exemplary embodiment of the present invention.

FIG. 5 shows a first example of the operation according to the exemplary embodiment of the present invention. P2P GO-A and P2P GO-B are two neighboring P2P GOs operating in each other's transmission range. P2P GO-A sends Probe Request with P2P Information Element (P2P IE) (Operation 301). This triggers P2P GO-B to send a Probe Response by including the requested Group Information Attribute in the P2P IE (Operation 302). The same procedure may be independently initiated by P2P GO-B as well.

When knowing the client information of P2P GO-B, P2P GO-A computes the sum of their group sizes to decide on whether their combined group size is less or equal to the maximum permissible group size (or a threshold size) of either P2P GO-A or P2P GO-B (Operation 303). If the combined group size is not greater than the maximum permissible group size (or the threshold size), P2P GO-A then sends a Request to Merge (RTM) which may be a modified Probe Request Broadcast frame appending the necessary merging related information (Operation 304). When receiving the RTM, P2P GO-B may send a Confirm to Merge (CTM) which may be a modified Probe Request Broadcast frame appending the necessary merging related information (Operation 305). The exchange of RTM-CTM messages in a broadcast fashion enables all neighboring P2P GOs operating in their radio transmission range know that P2P GO-A and P2P GO-B are in a merging process and they may refrain from merging with either of P2P GO-A and P2P GO-B. Modifying Probe Request broadcast frame for the purpose of constructing RTM-CTM allows us to stay within the scope of the standard and send broadcast message on all channels such that P2P GOs operating in other channels may also listen to the RTM-CTM handshake performed between P2P GO-A and P2P GO-B.

It may also be decided in the RTM-CTM handshake as to which one among P2P GO-A and P2P GO-B would dissolve its group and join the other's group. This can be decided as the group with lower BBSID merges with the group with higher BSSID or vice-versa, or decided by some tie-breaker bit, or decided by whoever initiates the handshake process or vice-versa or by some similar mechanism. In case where P2P GO-A and P2P GO-B has different capability to support different group sizes, then it may be checked which one among P2P GO-A and P2P GO-B has the required vacant positions in its group to accommodate the other group. Based on the result, the decision of which group dissolves itself to merge with the other may be made. In the example shown in FIG. 5, P2P GO-A dissolves its group by instructing its associated P2P Clients to send a connection request to P2P GO-B. It may be noted that the Probe Response usually generated in response to a received Probe Request may be disabled in case of RTM-CTM handshake. This means, if a Probe Request is sent as RTM or CTM frame, then a system may disable its Probe Response to prevent unnecessary traffic.

9.3) Second Example of Operation

Figure 6:
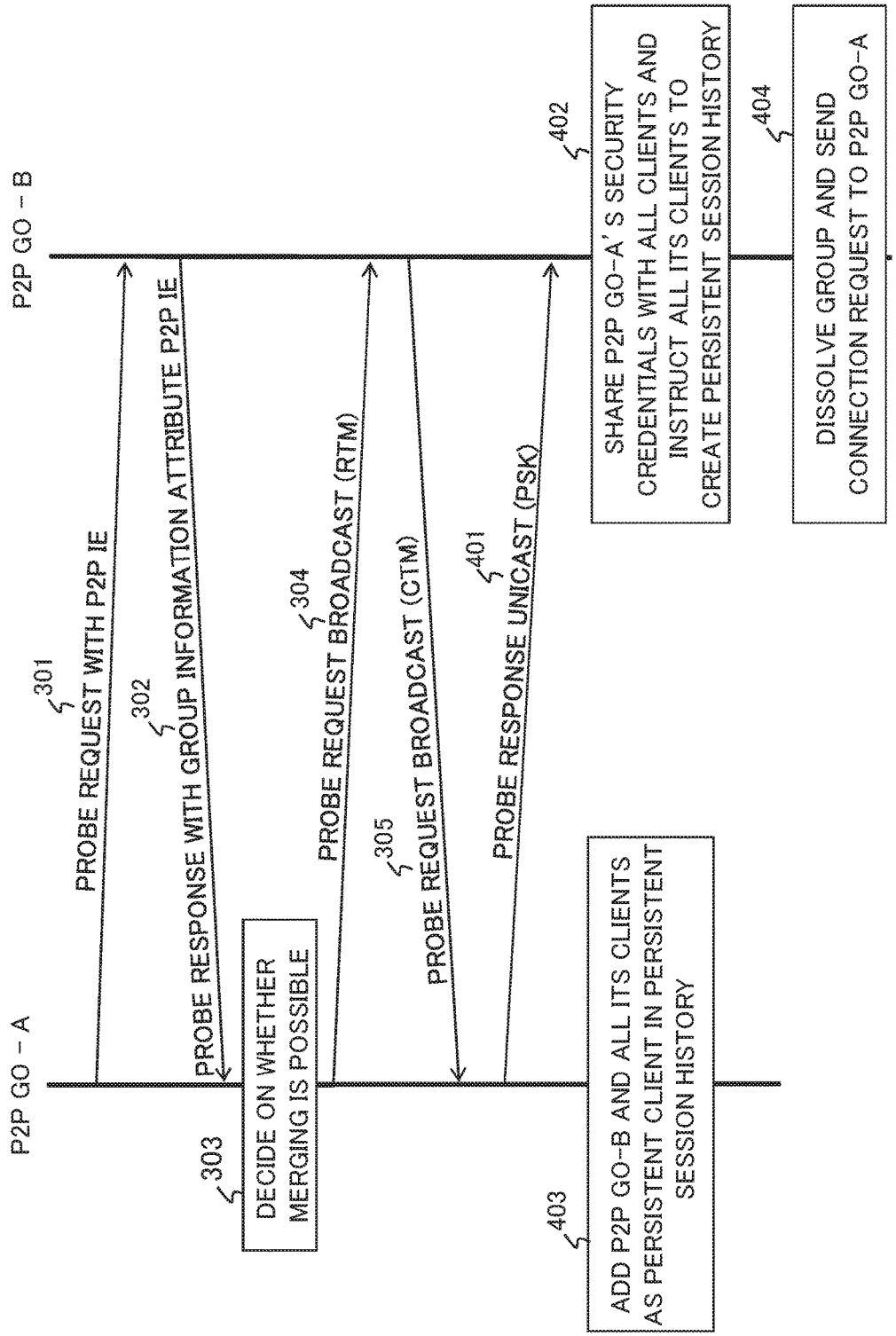
FIG. 6 is a schematic diagram showing a second example of message exchange before group merging according to the exemplary embodiment of the present invention.

FIG. 6 shows a second example of the operation according to the exemplary embodiment of the present invention. P2P GO-A and P2P GO-B are two neighboring P2P GOs operating in each other's radio transmission range. P2P GO-A sends Probe Request with P2P Information Element (P2P IE) (Operation 301). This triggers P2P GO-B to send a Probe Response by including the requested Group Information Attribute in the P2P IE (Operation 302). The same procedure may be independently initiated by P2P GO-B as well.

When knowing the client information of P2P GO-B 302, P2P GO-A computes the sum of their group sizes to decide on whether the combined group size is less or equal to the maximum permissible group size (or a threshold size) of either P2P GO-A or P2P GO-B (Operation 303). P2P GO-A then sends a Request to Merge (RTM) which may be a modified Probe Request Broadcast frame appending the necessary merging related information (Operation 304). When receiving the RTM, P2P GO-B may send a Confirm to Merge (CTM) which may be a modified Probe Request Broadcast frame appending the necessary merging related information (Operation 305). The exchange of RTM-CTM messages in a broadcast fashion enables all neighboring P2P GOs operating in their radio transmission range know that P2P GO-A and P2P GO-B are in a merging process and they may refrain from merging with either of P2P GO-A and P2P GO-B. Modifying Probe Request broadcast frame for the purpose of constructing RTM-CTM allows us to stay within the scope of the standard and send broadcast message on all channels supported by Wi-Fi P2P standard such that P2P GOs operating in other channels may also listen to the RTM-CTM handshake performed between P2P GO-A and P2P GO-B.

When receiving the CTM broadcast from P2P GO-B, P2P GO-A may send a Probe Response Unicast with the security credentials like Pre-Shared Key (PSK) to P2P GO-B (Operation 401). Such security credentials may be shared by P2P GO-B among its associated P2P Clients and may be used for creating persistent session history with P2P GO-A (Operation 402). P2P GO-A also adds P2P GO-B and its associated P2P Clients in its persistent session history (Operation 403). Thus, P2P GO-B and all its associated P2P Clients may join P2P GO-A by invitation which drastically reduces the disruption time from the dissolution of P2P GO-B's group till all group members connect to P2P GO-A (Operation 404).

9.4) Third Example of Operation

Figure 7:
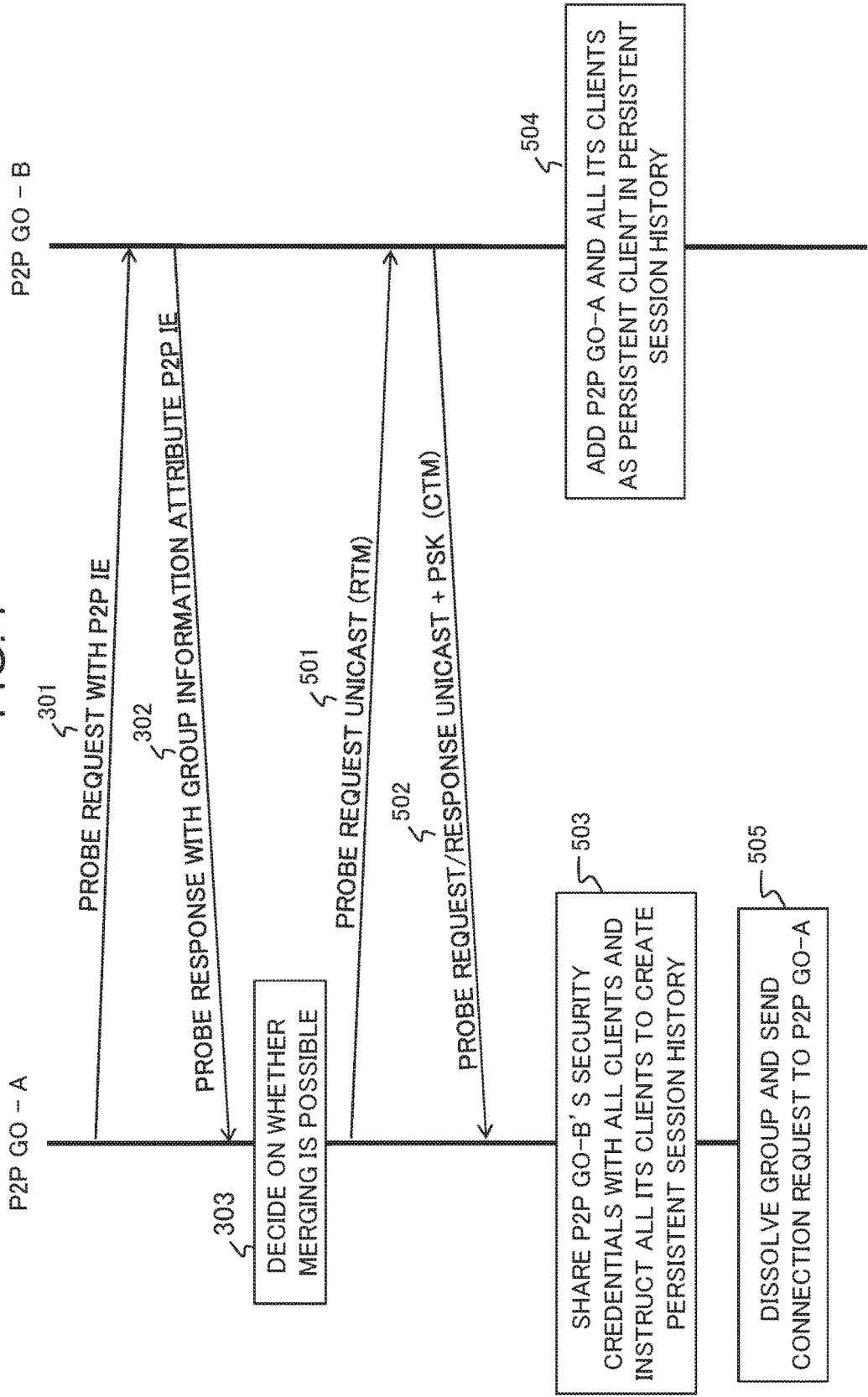
FIG. 7 is a schematic diagram showing a third example of message exchange before group merging according to the exemplary embodiment of the present invention.

FIG. 7 shows a third example of the operation according to the exemplary embodiment of the present invention. P2P GO-A and P2P GO-B are two neighboring P2P GOs operating in each other's radio transmission range. P2P GO-A sends Probe Request with P2P Information Element (P2P IE) (Operation 301). This triggers P2P GO-B to send a Probe Response by including the requested Group Information Attribute in the P2P IE (Operation 302). The same procedure may be independently initiated by P2P GO-B as well.

When knowing the client information of P2P GO-B 302, P2P GO-A computes the sum of their group sizes to decide on whether the combined group size is less or equal to the maximum permissible group size (or a threshold size) of either P2P GO-A or P2P GO-B (Operation 303). P2P GO-A then sends a Request to Merge (RTM) which may be a modified Probe Request Unicast frame appending the necessary merging related information (Operation 501). When receiving the RTM, P2P GO-B sends a Confirm to Merge (CTM) which may be a modified Probe Request Unicast frame or Probe Response Unicast frame appending the necessary merging related information (Operation 502). The CTM may also include the security credentials like Pre-Shared Key to create persistent session history and join by invitation. The exchange of RTM-CTM messages in a unicast fashion would reduce traffic overhead created in broadcast. When receiving CTM from P2P GO-B, P2P GO-A may share the security credentials among its associated P2P Clients and may be used for creating persistent session history with P2P GO-B (Operation 503). P2P GO-B also adds P2P GO-A and its associated P2P Clients in its persistent session history (Operation 504). Then, P2P GO-A and all its associated P2P Clients may join P2P GO-B by invitation which drastically reduces the disruption time from the dissolution of P2P GO-B's group till all group members connect to P2P GO-A (Operation 505).

9.5) Fourth Example of Operation

Figure 8:
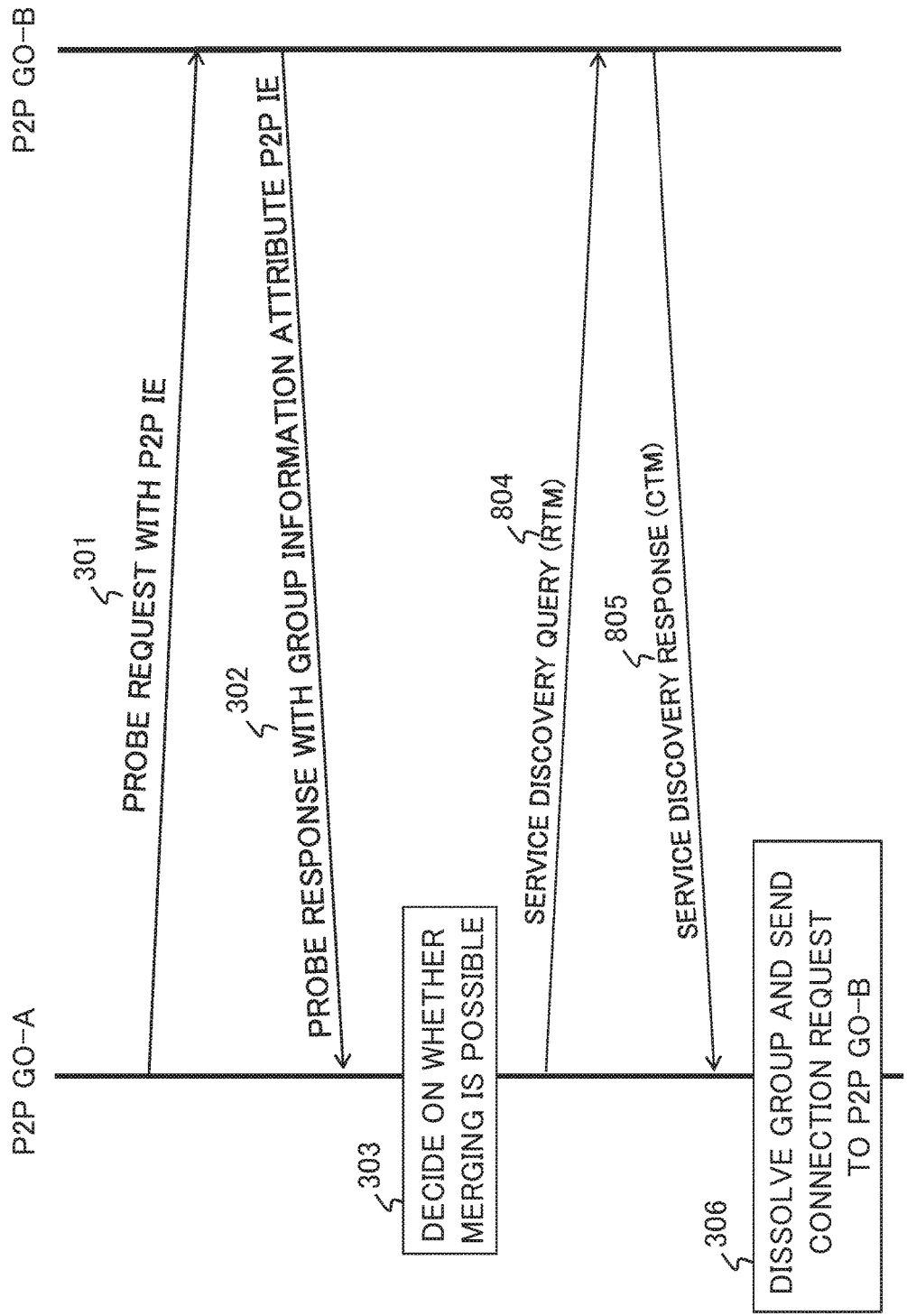
FIG. 8 is a schematic diagram showing a fourth example of message exchange before group merging according to the exemplary embodiment of the present invention.

FIG. 8 shows a fourth example of the operation according to the exemplary embodiment of the present invention. P2P GO-A and P2P GO-B are two neighboring P2P GOs operating in each other's radio transmission range. P2P GO-A sends Probe Request with P2P Information Element (P2P IE) (Operation 301). This triggers P2P GO-B to send a Probe Response by including the requested Group Information Attribute in the P2P IE (Operation 302). The same procedure may be independently initiated by P2P GO-B as well.

When knowing the client information of P2P GO-B through the Operation 302, P2P GO-A computes the sum of their group sizes to decide on whether the combined group size is less or equal to the maximum permissible group size (or a threshold size) of either P2P GO-A or P2P GO-B (Operation 303). P2P GO-A then sends a Request to Merge (RTM) which may be a Service Discovery Query frame as RTM (Operation 804) appending the necessary merging related information in the Vendor-Specific Content field of the frame. P2P GO-B may then reply to P2P GO-A by sending a Service Discovery Response frame as CTM (Operation 805) where the merging-related information may be put in the Vendor-Specific Content field of the frame. Although not shown in the figure, there can be one or more Service Discovery Query exchanged after this to confirm the merging operation.

After the merging-related handshakes, P2P GO-A may instruct all its associated group members to connect to P2P GO-B. Thus P2P GO-A and all its group members connect to P2P GO-B (Operation 306).

9.6) Fifth Example of Operation

FIG. 9 shows a fifth example of the operation according to the exemplary embodiment of the present invention. P2P GO-A and P2P GO-B are two neighboring P2P GOs operating in each other's radio transmission range. P2P GO-A sends Probe Request with P2P Information Element (P2P IE) (Operation 301). This triggers P2P GO-B to send a Probe Response by including the requested Group Information Attribute in the P2P IE (Operation 302). The same procedure may be independently initiated by P2P GO-B as well.

When knowing the client information of P2P GO-B through the Operation 302, P2P GO-A computes the sum of their group sizes to decide on whether the combined group size is less or equal to the maximum permissible group size (or a threshold size) of either P2P GO-A or P2P GO-B (Operation 303). P2P GO-A then sends a Request to Merge (RTM) which may be a Service Discovery Query frame as RTM (Operation 901) appending the necessary merging related information in the Vendor-Specific Content field of the frame. P2P GO-B may then reply to P2P GO-A by sending a Service Discovery Response frame as CTM (Operation 902) where the merging-related information and some security credential (for example, a security key) may be put in the Vendor-Specific Content field of the frame. Although not shown in the figure, there can be one or more Service Discovery Query exchanged after this to confirm the merging operation.

After the merging-related handshakes, P2P GO-A may share security credentials received from P2P GO-B among its associated P2P Clients and may be used for creating persistent session history with P2P GO-A (Operation 503). P2P GO-B also adds P2P GO-A and its associated P2P Clients in its persistent session history (Operation 504). Thus, P2P GO-A and all its associated P2P Clients may join P2P GO-B by invitation which drastically reduces the disruption time from the dissolution of P2P GO-A's group till all group members connect to P2P GO-B.

10. Other Modifications

Where applicable, various embodiments of the present invention may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Application software in accordance with the exemplary embodiment, such as computer programs executed by the device and may be stored on one or more computer readable mediums. It is also contemplated that the steps identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although embodiments of the present invention have been described, these embodiments illustrate but do not limit the disclosure. For example, the word "device" may define Group Owner, Client, or P2P device connectable to a group but not connected to any group. For example, the word "merging" may define a group owner device of a first P2P group disconnecting all associated clients of the first group, after which group owner device of first P2P group and all clients of first P2P group connecting to the owner device of a second P2P group. Thus, use of the term "merging" in this disclosure may imply the first P2P group joining the second P2P group to form at least one single group.

It should also be understood that embodiments of the present invention should not be limited to these above-described embodiments but that numerous modifications and variations may be made by one of ordinary skill in the art in accordance with the principles of the present invention and be included within the spirit and scope of the present invention as hereinafter claimed.

The above exemplary embodiments of the present invention can be applied to wireless peer-to-peer (P2P) networks. This invention can be applied to wireless peer-to-peer (P2P) networks.

11. Supplementary Note

The whole or part of the exemplary embodiments disclosed above can be described as, but not limited to, the following supplementary notes.

(Supplementary Note 1)

A method comprising:

performing a scan to discover at least one Peer to Peer (P2P) group;

sharing information pertaining to group merging with at least one device of a second P2P group by at least one device of a first P2P group;

devices of the first P2P group disconnecting from the first owner device and connecting with owner device of the second P2P group to form at least one single group.

(Supplementary Note 2)

The method according to Supplementary note 1, wherein the scan may be performed by scanning at least one of the channels.

(Supplementary Note 3)

The method according to Supplementary note 1, wherein the information pertaining to group merging may comprise at least one of:

number of group members in a P2P group maximum group size that can be supported by a P2P group owner device identification number of a P2P group owner device identification number of the second P2P group with which the first P2P group wants to merge security credentials of a P2P group to allow merging by invitation mechanism (Supplementary Note 4)

The method according to Supplementary note 1, wherein the first owner device may send information pertaining to group merging to a second owner device with at least one of the following holding true:

sum of group size of first owner device and second owner device is less than or equal to the maximum supportable P2P group size of first owner device or second owner device at least one client of first group can receive a transmitted signal from second owner device with a received signal strength greater or equal to a threshold or at least one client of second group can receive a transmitted signal from first owner device with a received signal strength greater or equal to a threshold.

(Supplementary Note 5)

The method according to Supplementary note 1, wherein a first P2P group owner device shares the information with at least one P2P Client of the first group to disconnect from the first owner device and connect with the owner device of a second P2P group at the time of merging; the first owner device also may connect with the second owner device.

(Supplementary Note 6)

The method according to Supplementary note 1, wherein a first P2P group owner device intending to merge with a second P2P group owner device wherein the sum of group size of the first P2P group and second P2P group is less or equal to a threshold or the maximum supportable size of either of first or second P2P group owner, may send a merging request broadcast containing at least the group identification number of second P2P group on at least one channel.

(Supplementary Note 7)

The method according to Supplementary note 1, wherein a second P2P group owner device intending to merge with a first P2P group owner device wherein the sum of group size of the first P2P group and second P2P group is less or equal to a threshold or the maximum supportable size of either of first or second P2P group owner may send a merging response broadcast containing at least the group identification number of first P2P group on at least one channel.

(Supplementary Note 8)

The method according to Supplementary note 1, wherein a second P2P group owner device intending to merge with a first P2P group owner device wherein the sum of group size of the first P2P group and second P2P group is less or equal to a threshold or the maximum supportable size of either of first or second P2P group owner may send a merging response unicast to the first P2P group owner device.

(Supplementary Note 9)

The method according to Supplementary note 1, wherein a P2P group owner device which receives merging requests from multiple P2P group owner devices may send merging response to at least one of the requesting P2P group owner device.

(Supplementary Note 10)

The method according to Supplementary note 1, wherein a first P2P group owner device sending a merging request to a second P2P group owner device may wait for merging response from the second P2P group owner device till a time limit.

(Supplementary Note 11)

The method according to Supplementary note 1, wherein a first P2P group owner device sending a merging request to a second P2P group owner device and waiting for merging response from the second P2P group owner device till a time limit, may merge with the second P2P group only if receives a merging response till a time limit.

(Supplementary Note 12)

The method according to Supplementary note 1, wherein a first P2P group with higher value of group identification number may merge with second P2P group with lower value of group identification number, or, the second P2P group with lower identification number may merge with the first P2P group with higher identification number.

(Supplementary Note 13)

The method according to Supplementary note 1, wherein the first P2P group and second P2P group may exchange a tie-breaker information to decide if the first group merges with the second group or the second group merges with the first group.

(Supplementary Note 14)

The method according to Supplementary note 1, wherein if the first owner device initiates the merging handshake with the second owner device, then the first P2P group may merge with the second P2P group, or the second P2P group may merge with the first P2P group.

(Supplementary Note 15)

The method according to Supplementary note 1, wherein a P2P group owner device which has a group size less than a threshold or the maximum size that it can support, sends Probe Request with P2P Information Element.

(Supplementary Note 16)

The method according to Supplementary note 1, wherein a second P2P group owner device may include information about at least one client of the second group in P2P Group Information Attribute of Probe Response after receiving Probe Request with P2P Information Element from first P2P group owner device.

(Supplementary Note 17)

The method according to Supplementary note 1, wherein a first P2P group owner device may send a Probe Request unicast or broadcast frame including merging related information to a second P2P group owner device as merging request.

(Supplementary Note 18)

The method according to Supplementary note 1 or 17, wherein a second P2P group owner device after receiving a merging request from a first P2P group owner device, may send a Probe Response frame including merging related information to a second P2P group owner device as merging response.

(Supplementary Note 19)

The method according to Supplementary note 1 or 17 or 18, wherein a second P2P group owner device after receiving a merging request from a first P2P group owner device, may send a Probe Request unicast or broadcast frame including merging related information to the first P2P group owner device as merging response.

(Supplementary Note 20)

The method according to Supplementary note 1 or 17 or 18 or 19, wherein a second P2P group owner device after receiving a merging request from a first P2P group owner device, may suppress Probe Response frame and may send a Probe Request unicast or broadcast frame including merging related information to the first P2P group owner device as merging response.

(Supplementary Note 21)

The method according to Supplementary note 1 and 20, wherein the merging related information may comprise at least one of:

P2P Information Element

P2P Client Information

Operating Channel information

Security credential information like Pre-Shared Key.

12. Other Supplementary Note

The whole or part of the exemplary embodiments disclosed above can be described as, but not limited to, the following other supplementary notes.

(Supplementary Note 1)

A method for group formation in wireless peer-to-peer (P2P) networks, comprising:

exchanging group-related information between group owners of neighboring P2P groups;

deciding on whether a combined group of the neighboring P2P groups meets a predetermined condition of either of the neighboring P2P groups, based on the group-related information of the neighboring P2P groups; and merging the neighboring P2P groups to form at least one single group when the combined group meets the predetermined condition.

(Supplementary Note 2)

The method according to supplementary note 1, wherein the predetermined condition is that a total group size of the combined group is not greater than a maximum group size of either of the neighboring P2P groups.

(Supplementary Note 3)

The method according to supplementary note 1 or 2, wherein a group owner of the combined group is one of the group owners having a maximum permissible group size which is equal to or greater than a total group size of the combined group.

(Supplementary Note 4)

The method according to any one of supplementary notes 1-3, wherein the group-related information of one of the neighboring P2P groups includes: at least one of: a group identification number of the corresponding P2P group; number of group members in a corresponding P2P group; and maximum permissible group size of the corresponding P2P group.

(Supplementary Note 5)

The method according to any one of supplementary notes 1-4, wherein the exchanging of the group-related information is performed by each of the group owners sending a Probe Request containing its group-related information.

(Supplementary Note 6)

The method according to any one of supplementary notes 1-4, wherein the exchanging of the group-related information is performed by a first one of the group owners sending a Probe Request and receiving a Probe Response from a second one of the group owners, wherein the Prove Request contains first group-related information for the first group owner and the Prove Response contains second group-related information for the second group owner.

(Supplementary Note 7)

The method according to any one of supplementary notes 1-4, wherein the exchanging of the group-related information is performed by each of the group owners advertising the group-related information in Beacon.

(Supplementary Note 8)

The method according to any one of supplementary notes 1-7, further comprising:

performing a merging-related handshake between the group owners before merging the neighboring P2P groups.

(Supplementary Note 9)

The method according to supplementary note 8, wherein the merging-related handshake includes: sending a merging-related request in broadcast or unicast from a first group owner to a second group owner; and sending a merging-related response in broadcast or unicast from the second group owner to the first group owner.

(Supplementary Note 10)

The method according to supplementary note 8 or 9, wherein the merging-related handshake further includes a security credential of the corresponding P2P group to allow merging by P2P invitation procedure.

(Supplementary Note 11)

The method according to any of supplementary notes 1-10, wherein at least one of the exchanging of the group-related information and a merging-related handshake which includes a merging-related request and a merging-related response is performed by modifying or inserting at least one of the group-related information, merging-related request information and merging-related response information in the Vendor-Specific Content field of at least one of a Probe Request, a Probe Response a service discovery query, a service discovery response, an invitation request and an invitation response.

(Supplementary Note 12)

A wireless device operable as a group owner of a peer-to-peer (P2P) group in wireless P2P networks, comprising:

a first controller configured to send its own group-related information to a neighboring group owner of a neighboring P2P group and to receive neighboring group-related information from the neighboring group owner; and a second controller configured to:

decide on whether a combined group of its own P2P group and the neighboring P2P group meets a predetermined condition of either of its own P2P group and the neighboring P2P group, based on its own group-related information and the neighboring group-related information; and merge the neighboring P2P group and its own P2P group to form a single group when the combined group meets the predetermined condition.

(Supplementary Note 13)

The wireless device according to supplementary note 12, wherein the predetermined condition is that a total group size of the combined group is not greater than a maximum group size of either of its own P2P group and the neighboring P2P group.

(Supplementary Note 14)

The wireless device according to supplementary note 12 or 13, wherein a combined group owner of the combined group is a selected one of the group owner and the neighboring group owner, the selected one having a maximum permissible group size which is equal to or greater than a total group size of the combined group.

(Supplementary Note 15)

The wireless device according to any one of supplementary notes 12-14, wherein each of its own group-related information and the neighboring group-related information includes: at least one of: a group identification number of the corresponding P2P group; number of group members in a corresponding P2P group; and maximum permissible group size of the corresponding P2P group.

(Supplementary Note 16)

The wireless device according to any one of supplementary notes 12-15, wherein the first controller sends a Probe Request containing its own group-related information and receive another Probe Request containing the neighboring group-related information from the neighboring group owner.

(Supplementary Note 17)

The wireless device according to any one of supplementary notes 12-15, wherein the first controller sends a Probe Request containing and receiving a Probe Response to the Probe Request from the neighboring group owner, wherein the Prove Request contains its own group-related information and the Prove Response contains the neighboring group-related information.

(Supplementary Note 18)

The wireless device according to any one of supplementary notes 12-15, wherein the first controller advertises its own group-related information in a Beacon frame and receives the neighboring group-related information in a Beason frame.

(Supplementary Note 19)

The wireless device according to any one of supplementary notes 12-18, wherein the second controller performs a merging-related handshake with the neighboring group owner before merging the neighboring P2P group and its own P2P group.

(Supplementary Note 20)

The wireless device according to supplementary note 19, wherein the merging-related handshake includes: sending a merging-related request in broadcast or unicast to the neighboring group owner; and receiving a merging-related response in broadcast or unicast from the neighboring group owner.

(Supplementary Note 21)

The wireless device according to supplementary note 19 or 20, wherein the merging-related handshake further includes a security credential of the corresponding P2P group to allow merging by P2P invitation procedure.
(Supplementary Note 22)

The method according to any of supplementary notes 12-21, wherein at least one of the exchanging of the group-related information and a merging-related handshake which includes a merging-related request and a merging-related response is performed by modifying or inserting at least one of the group-related information, merging-related request information and merging-related response information in the Vendor-Specific Content field of at least one of a Probe Request, a Probe Response a service discovery query, a service discovery response, an invitation request and an invitation response.
(Supplementary Note 23)

A system for group formation in wireless peer-to-peer (P2P) networks, wherein
group owners of neighboring P2P groups exchange group-related information;
one of the neighboring P2P groups decides on whether a combined group of the neighboring P2P groups meets a predetermined condition of the one of the neighboring P2P groups, based on the group-related information of the neighboring P2P groups; and
the one of the neighboring P2P groups merges the other of the neighboring P2P groups to form at least one single group when the combined group meets the predetermined condition.

REFERENCE SIGNS LIST 10-13, 20-22, 102-105 Node
201 Radio system
202 User controller
203 Processor
204 Memory

The invention claimed is:

1. A method for group formation in wireless peer-to-peer (P2P) networks, comprising:
    by a first group owner of a first P2P group, discovering a second group owner of a second P2P group neighboring the first P2P group, wherein the first group owner and the second group owner are nodes in their respective P2P groups;
    exchanging group-related information between the first and second group owners of the neighboring P2P groups, the group-related information including at least group size information;
    by either the first group owner or the second group owner, deciding on whether a combined group of the neighboring P2P groups meets a predetermined condition of either of the neighboring P2P groups, based on first group size information of the first P2P group and second group size information of the second P2P group included in the group-related information of the neighboring P2P groups, wherein the predetermined condition is that a total group size of the combined group is not greater than a maximum permissible group size of either of the neighboring P2P groups; and
    merging the neighboring P2P groups to form at least one single group when the combined group meets the predetermined condition.

2. The method according to claim 1, wherein a group owner of the combined group is one of the group owners having the maximum permissible group size.

3. The method according to claim 1, wherein the group-related information of one of the neighboring P2P groups includes: at least one of:
    a group identification number of the corresponding P2P group;
    number of group members in a corresponding P2P group; and
    maximum permissible group size of the corresponding P2P group.

4. The method according to claim 1, further comprising:
    performing a merging-related handshake between the first and second group owners before merging the neighboring P2P groups.

5. The method according to claim 4, wherein the merging-related handshake includes:
    sending a merging-related request in broadcast or unicast from the first group owner to the second group owner; and
    sending a merging-related response in broadcast or unicast from the second group owner to the first group owner.

6. The method according to claim 4, wherein the merging-related handshake further includes a security credential of the corresponding P2P group to allow merging by P2P invitation procedure.

7. The method according to claim 1, wherein at least one of the exchanging of the group-related information and a merging-related handshake which includes a merging-related request and a merging-related response is performed by modifying or inserting at least one of the group-related information, merging-related request information and merging-related response information in the Vendor-Specific Content field of at least one of a Probe Request, a Probe Response a service discovery query, a service discovery response, an invitation request and an invitation response.

8. A wireless device operable as a group owner of a peer-to-peer (P2P) group in wireless P2P networks, comprising:
    a wireless transceiver; and
    at least one processor configured to execute instructions to:
    discover a neighboring group owner of a neighboring P2P group;
    send its own group-related information to the neighboring group owner and receive neighboring group-related information from the neighboring group owner through the wireless transceiver, wherein its own group-related information includes at least group size information of its own group and the neighboring group-related information includes at least neighboring group size information of the neighboring P2P group;
    decide on whether a combined group of its own P2P group and the neighboring P2P group meets a predetermined condition of either of its own P2P group and the neighboring P2P group, based on its own group size information and the neighboring group size information included in the neighboring group-related information, wherein the predetermined condition is that a total group size of the combined group is not greater than a maximum permissible group size of either of its own P2P group and the neighboring P2P group; and
    merge the neighboring P2P group and its own P2P group to form a single group when the combined group meets the predetermined condition.

9. The wireless device according to claim 8, wherein a combined group owner of the combined group is a selected one of the group owner and the neighboring group owner, the selected one having the maximum permissible group size.

10. The wireless device according to claim 8, wherein each of its own group-related information and the neighboring group-related information includes: at least one of: a group identification number of the corresponding P2P group; number of group members in a corresponding P2P group; and maximum permissible group size of the corresponding P2P group.

11. The wireless device according to claim 8, wherein the processor is configured to execute instructions to: send a Probe Request containing its own group-related information; and receive another Probe Request containing the neighboring group-related information from the neighboring group owner.

12. The wireless device according to claim 8, wherein the processor is configured to execute instructions to send a Probe Request and receiving a Probe Response to the Probe Request from the neighboring group owner, wherein the Probe Request contains its own group-related information and the Probe Response contains the neighboring group-related information.

13. The wireless device according to claim 8, wherein the processor is configured to execute instructions to: advertise its own group-related information in a Beacon frame; and receive the neighboring group-related information in a Beacon frame.

14. The wireless device according to claim 8, wherein the processor is configured to execute instructions to perform a merging-related handshake with the neighboring group owner before merging the neighboring P2P group and its own P2P group.

15. The wireless device according to claim 14, wherein the merging-related handshake includes: sending a merging-related request in broadcast or unicast to the neighboring group owner; and receiving a merging-related response in broadcast or unicast from the neighboring group owner.

16. The wireless device according to claim 14, wherein the merging-related handshake further includes a security credential of the corresponding P2P group to allow merging by P2P invitation procedure.

17. The wireless device according to claim 8, wherein at least one of the exchanging of the group-related information and a merging-related handshake which includes a merging-related request and a merging-related response is performed by modifying or inserting at least one of the group-related information, merging-related request information and merging-related response information in the Vendor-Specific Content field of at least one of a Probe Request, a Probe Response a service discovery query, a service discovery response, an invitation request and an invitation response.

18. A non-transitory recording medium that stores a computer-readable program to make a computer function as a wireless device operable as a group owner of a peer-to-peer (P2P) group in wireless P2P networks, the program comprising a set of instructions to:
  send its own group-related information to a neighboring group owner of a neighboring P2P group, its own group-related information including at least group size information of its own group;
  receive neighboring group-related information from the neighboring group owner, the neighboring group-related information including at least neighboring group size information of the neighboring P2P group;
  decide on whether a combined group of its own P2P group and the neighboring P2P group meets a predetermined condition of either of its own P2P group and the neighboring P2P group, based on its own group size information and the neighboring group size information included in the neighboring group-related information, wherein the predetermined condition is that a total group size of the combined group is not greater than a maximum permissible group size of either of its own P2P group and the neighboring P2P group; and
  merge the neighboring P2P group and its own P2P group to form a single group when the combined group meets the predetermined condition.

\* \* \* \* \*